(12) United States Patent
Bostedt

(10) Patent No.: US 7,055,844 B1
(45) Date of Patent: Jun. 6, 2006

(54) TRAILER HITCH STORAGE APPARATUS

(76) Inventor: Thomas Bostedt, 220 Desplaine Rd., DePere, WI (US) 54115-3725

( * ) Notice: Subject to any disclaimer, the term of this patent is extended or adjusted under 35 U.S.C. 154(b) by 0 days.

(21) Appl. No.: 10/806,599

(22) Filed: Mar. 23, 2004

(51) Int. Cl.
*B60D 1/14* (2006.01)
(52) U.S. Cl. .................... 280/491.5; 224/405; 224/403
(58) Field of Classification Search ............ 280/491.1, 280/491.5, 415.1, 480.1, 504; 224/403, 404, 224/405, 488, 519, 402
See application file for complete search history.

(56) References Cited

U.S. PATENT DOCUMENTS

| | | | | |
|---|---|---|---|---|
| 3,285,426 A | * | 11/1966 | Wilcke .................... 211/70.6 |
| 3,985,324 A | * | 10/1976 | Larson .................. 248/220.42 |
| 4,696,405 A | * | 9/1987 | Waring ........................ 211/4 |
| 5,476,279 A | | 12/1995 | Klemetsen ............... 280/415.1 |
| 5,522,685 A | * | 6/1996 | Lessard ..................... 410/121 |
| 5,662,254 A | * | 9/1997 | Lemajeur et al. ........... 224/405 |
| 5,676,257 A | * | 10/1997 | Adkins ........................ 211/4 |
| 5,678,839 A | * | 10/1997 | Pobud et al. ............ 280/491.5 |
| 6,042,136 A | | 3/2000 | Heinecke .................... 280/477 |
| 6,077,004 A | * | 6/2000 | Denman, Jr. ................. 410/8 |
| 6,125,945 A | | 10/2000 | Skaggs et al. .............. 172/439 |
| 6,149,181 A | | 11/2000 | Biederman ............... 280/491.1 |
| 6,234,512 B1 | | 5/2001 | Bettenhausen ........... 280/491.1 |
| 6,250,400 B1 | * | 6/2001 | Bucko ........................ 173/184 |
| 6,460,870 B1 | | 10/2002 | Moss ...................... 280/491.3 |
| 6,527,292 B1 | * | 3/2003 | Adair ...................... 280/491.3 |
| 6,641,014 B1 | * | 11/2003 | McNalley ................... 224/405 |
| 2002/0017770 A1 | | 2/2002 | Parrish .................... 280/480.1 |
| 2002/0190534 A1 | * | 12/2002 | Armstrong .................... 296/3 |
| 2003/0057676 A1 | * | 3/2003 | Griggs et al. ............... 280/504 |
| 2003/0230608 A1 | * | 12/2003 | Henry ........................ 224/403 |
| 2004/0150189 A1 | * | 8/2004 | Deanda ................... 280/491.1 |

* cited by examiner

*Primary Examiner*—Lesley D. Morris
*Assistant Examiner*—Daniel Yeagley
(74) *Attorney, Agent, or Firm*—Boyle, Fredrickson, Newholm, Stien & Gratz, S.C.

(57) ABSTRACT

A trailer hitch storage apparatus designed to carry a removable trailer hitch used in receiver type hitches. The apparatus consists of a frame comprising a mounting plate, at least one bracket for supporting the trailer hitch extending from the mounting plate, a center hanger that extends through the hitch pin hole on the trailer hitch, and a mounting arrangement for attaching the mounting plate to the vehicle. Alternative embodiments accommodate attachment to a truck or a vehicle such as an SUV having an enclosed compartment. A quick-folding collapsible apparatus having the same general structure is also described.

17 Claims, 9 Drawing Sheets

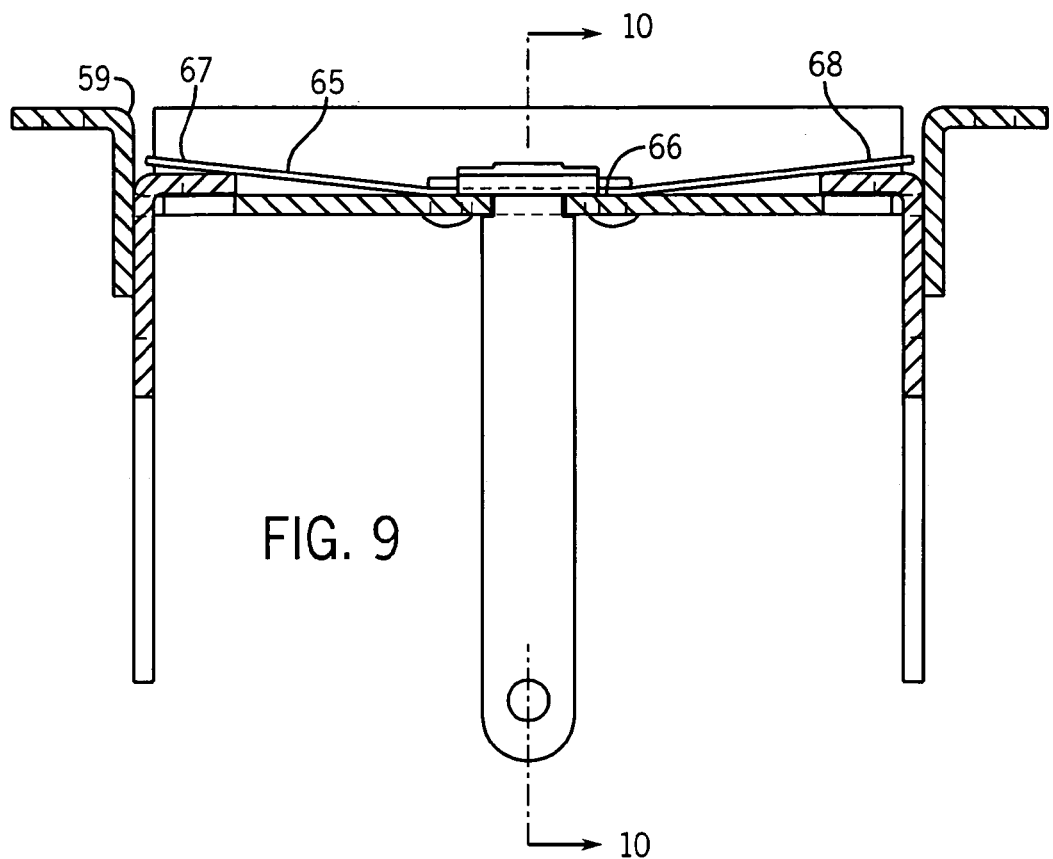

TRAILER HITCH STORAGE APPARATUS

BACKROUND AND SUMMARY OF THE INVENTION

The present invention relates generally to a trailer hitch storage apparatus, and more particularly to a storage apparatus for a trailer hitch designed to be mounted to a truck bed or in the interior of an SUV.

A trailer hitch is commonly secured to a hitch receiver mounted to the rear end of a vehicle to enable the vehicle to tow trailers or the like. Typically, the hitch receiver is mounted to a cross-tube or cross-beam which is secured to the frame of the vehicle, and has a rearwardly facing passage into which an elongated mounting member of the trailer hitch is inserted. The trailer hitch is normally secured to the receiver by means of a pin extending through the receiver and the mounting member of the trailer hitch. When so installed, the rearward end of the trailer hitch extends a considerable distance rearwardly of the receiver and the vehicle.

Problems can arise when a trailer hitch is not being used to tow a trailer but remains attached to the hitch assembly. For example, when a vehicle is backing up or parallel parking in a tight space, the trailer hitch can strike a vehicle or other object located behind the vehicle to which the trailer hitch is mounted. The trailer hitch also can present a problem when an individual is attempting to fit the vehicle into a tight space such as a garage. Another potential problem is that an inattentive individual can strike his or her leg on the trailer hitch when walking behind the vehicle.

A relatively easy solution to the above mentioned problems is to remove the trailer hitch when not in use. Removal of the trailer hitch, however, presents its own set of problems. Once the trailer hitch is removed, an adequate storage place is required. Often times the trailer hitch is greasy or dirty and there is no appropriate place to store it. Sometimes, the trailer hitch gets placed under the seat of car or tossed in the back of a pickup truck. This inadvertent placement of the trailer hitch and hitch pin can lead to the trailer hitch and pin being misplaced or lost. When it comes time to use the trailer hitch, substantial time can be wasted searching for the trailer hitch or the pin. If the trailer hitch is simply left in the back of an open pickup it can be easily stolen.

One solution to the noted problems is discussed in U.S. Pat. No. 5,476,279 to Klemetsen wherein the trailer hitch is stored in the ends of the cross beam or cross tube that is mounted to the frame of the vehicle. This structure necessitates a beam or tube with open ends, and can result in the lateral extension of the beam or tube which presents similar problems to those discussed above. A similar solution with the same limitations is presented in U.S. Pat. No. 6,234,512 to Bettenhausen wherein a hollow member is presented beneath the cross beam for supporting the trailer hitch when not in use.

In view of the foregoing, it is a primary object of the present invention to provide a mounted storage mechanism for a receiver-type trailer hitch system. The storage system should be easy accessible to the user and allow for quick and easy storage of the trailer hitch and hitch pin. The storage system should be supportable on an existing truck bed or the inside of an SUV, without adaptation thereof. Moreover, the storage system should provide an additional security feature to prevent theft of the trailer hitch.

It is another object of the invention to reduce or eliminate the potential for a person to misplace the trailer hitch or the hitch pin and provide a convenient storage location within the vehicle on which it is used. It is a further object of the invention to provide a mechanism that is collapsible so as to conserve space when it is not in use. A final object of the invention is to provide a trailer hitch storage apparatus which is economical to manufacture and easy to install.

Consistent with the foregoing objects, and in accordance with the invention as embodied and broadly described herein, an apparatus is disclosed, in suitable detail to enable one of ordinary skill in the art to make and use the invention. A trailer hitch storage apparatus designed to carry a removable trailer hitch used in receiver-type hitches is described. The apparatus consists of a frame having a mounting plate, at least one bracket extending from the mounting plate for supporting the trailer hitch, a centrally located hanger that extends through a hitch pin hole on the mounting member of the trailer hitch, and a means for attaching the mounting plate to the vehicle. Several embodiments are described, with variations in the mounting plate to accommodate attachment to a truck or to an SUV. The trailer hitch storage apparatus stores the trailer hitch in a secure location, along with the hitch pin. The hitch pin may be stored by placing the pin through a hole on the bracket or placing it within the tubular support. If placed in a hole, the pin is disposed at an angle over the hanger of the storage apparatus and behind the trailer hitch. The trailer hitch is secured to the apparatus by resting between bracket, with the hanger extending through the hitch pin hole on the trailer hitch. The trailer hitch may be held in place with a pin or lock that extends through an opening in the hanger. The invention also contemplates a quick-folding collapsible trailer hitch storage apparatus having the same general structure as summarized above.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 6 is an isometric view of a second embodiment of the trailer hitch storage apparatus of the present invention, designed for attachment to the inner wall of an SUV or the like;

FIG. 9 is a cross-sectional view taken on line 9—9 of FIG. 7;

FIG. 10 is a cross-sectional view taken on line 10—10 of FIG. 9;

DETAILED DESCRIPTION OF THE INVENTION

Figure 1:
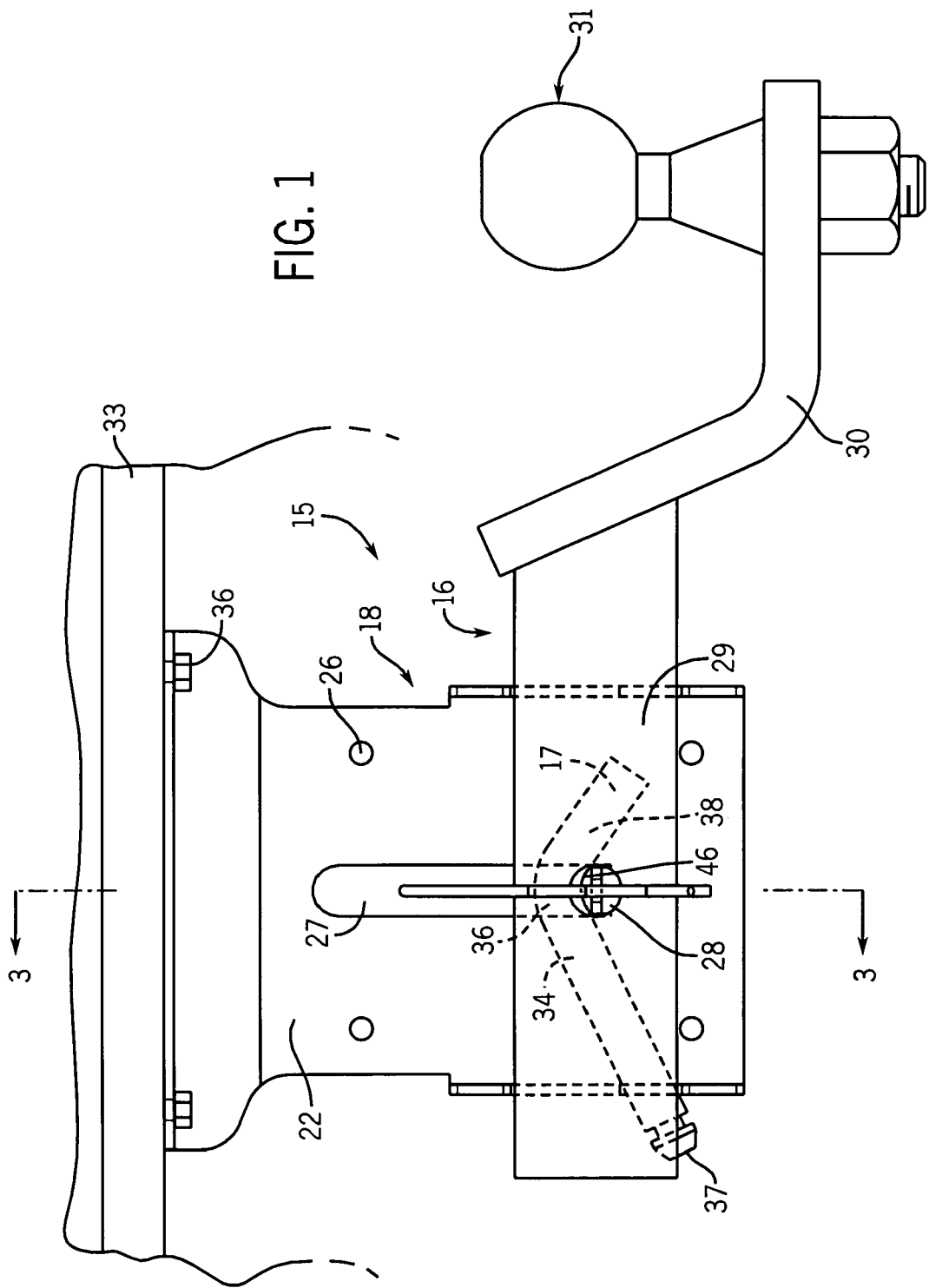
FIG. 1 is a front elevation view of one preferred embodiment of the trailer hitch storage apparatus of the present invention attached to a pickup truck bed, the apparatus shown retaining the trailer hitch with the hitch pin shown in phantom.

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected" or terms similar thereto are often used. Such terms are not limited to direct connection but include connection through other elements where such connection is recognized as being equivalent by those skilled in the art.

FIG. 1 illustrates a first embodiment of the trailer hitch storage apparatus 15 of the present invention securing a conventional trailer hitch 16 and hitch pin 17 (shown in phantom). The trailer hitch 16 includes a tubular mounting member or support 29 configured to be received in the passage defined by a tubular receiver of a conventional receiver-type trailer hitch mounting apparatus (not shown). Trailer hitch 16 includes a trailer engagement bar 30 connected to a hitch ball assembly 31. The hitch pin 17 includes a horizontally extending engaging section 34, an angled handle 38 and a juncture point 36 between the engaging section 34 and the angled handle 38. The tubular support 29 includes at least one aperture 28 configured to receive the hitch pin 17 to secure the trailer hitch 16 to the hitch receiver, in a manner as is known. The aperture 28 in the tubular support 29 is also used as a means to secure the trailer hitch 16 to the storage apparatus 15 as will be discussed below.

Referring to FIGS. 1–4, trailer hitch storage apparatus 15 may be mounted to the inside of the bed of a pickup truck. As shown in FIG. 1, the storage apparatus 15 is configured to receive and secure a trailer hitch 16 and hitch pin 17 (shown in phantom). The apparatus 15 is comprised of a frame 18, including a mounting plate 19 for mounting the apparatus 15 to the interior wall 33 of a bed of a pickup truck, a pair of trailer hitch receiving brackets 20a, 20b extending from the mounting plate 19, and a center post 21 extending from the mounting plate 19.

Figure 2:
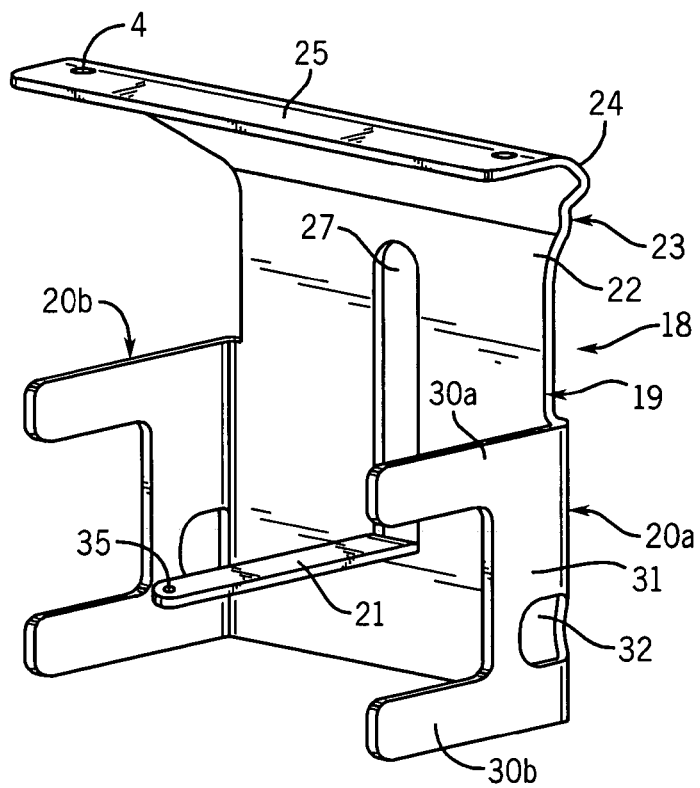
FIG. 2 is an isometric view of the trailer hitch storage apparatus shown in FIG. 1.

The mounting plate 19 is in the form of a flat, rectangular base plate 22 and an integral mounting bracket 23. The mounting bracket 23 includes an angled mid-section 24 connected to the base plate 22 that terminates in a horizontal engagement plate 25. The horizontal engagement plate 25 includes a pair of apertures 84 configured to receive a conventional securing means such as nut and bolt assembly, rivet, screw or other known securing means 36. As shown in FIGS. 1 and 2, the engagement plate 25 is configured to align with and connect the apparatus 15 to the inner wall 33 of a truck bed. The base plate 22 further includes a series of spaced apertures 26, near the corners of the base plate 22. The apertures 26 may be used to receive fasteners to secure the base plate 22 to the wall of the pickup truck bed, as an alternative or in addition to the fasteners that extend through the engagement plate 25.

A pair of trailer hitch receiving brackets 20a, 20b extend outwardly from base plate 22, and are configured to receive and secure the tubular support 29 of trailer hitch 16. Each of trailer hitch receiving brackets 20a, 20b includes a pair of horizontal receiving arms 30a and 30b that extend at a length long enough to receive and secure the tubular support 29. Each of brackets 20a, 20b further includes a vertically extending support 31 between the receiving arms 30a and 30b and connected to the base plate 22. The vertical supports 31 include a-hitch-pin-receiving hole 32 configured to receive hitch pin 17.

A vertical slot 27 extends throughout the central area of base plate 22, and has substantially the same dimensions as the center post 21. In the illustrated embodiment, during manufacture the center post 21 is cut out of the base plate 22 and bent at a right angle thereby forming the slot 27. As shown in FIG. 2, the center post 21 extends horizontally at a right angle from the base plate 22 at a length that is slightly longer than the trailer hitch receiving brackets 20a and 20b. The center post 21 has a width that is configured to allow the center post 21 to fit through the hitch pin receiving hole 28 of tubular support 29 of trailer hitch 16, and a length that will allow the post 21 to extend entirely through the tubular support 29. In this manner, a pin-receiving aperture 35 formed in the end area of the center post 21 is accessible following insertion of the center post 21 through tubular support 29. A cotter pin 39 or other trailer hitch retention means is received through the aperture 35, thereby securing the trailer hitch 16 to the storage apparatus 15.

Figure 3:
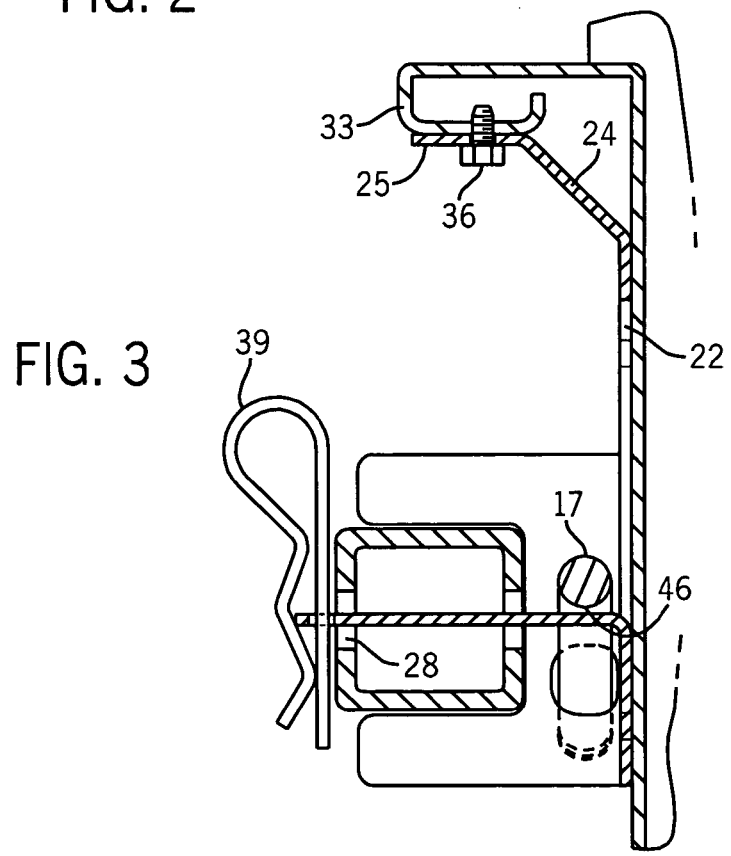
FIG. 3 is a cross-sectional view of the attached apparatus and trailer hitch, taken on line 3—3 of FIG. 1.
Figure 4:
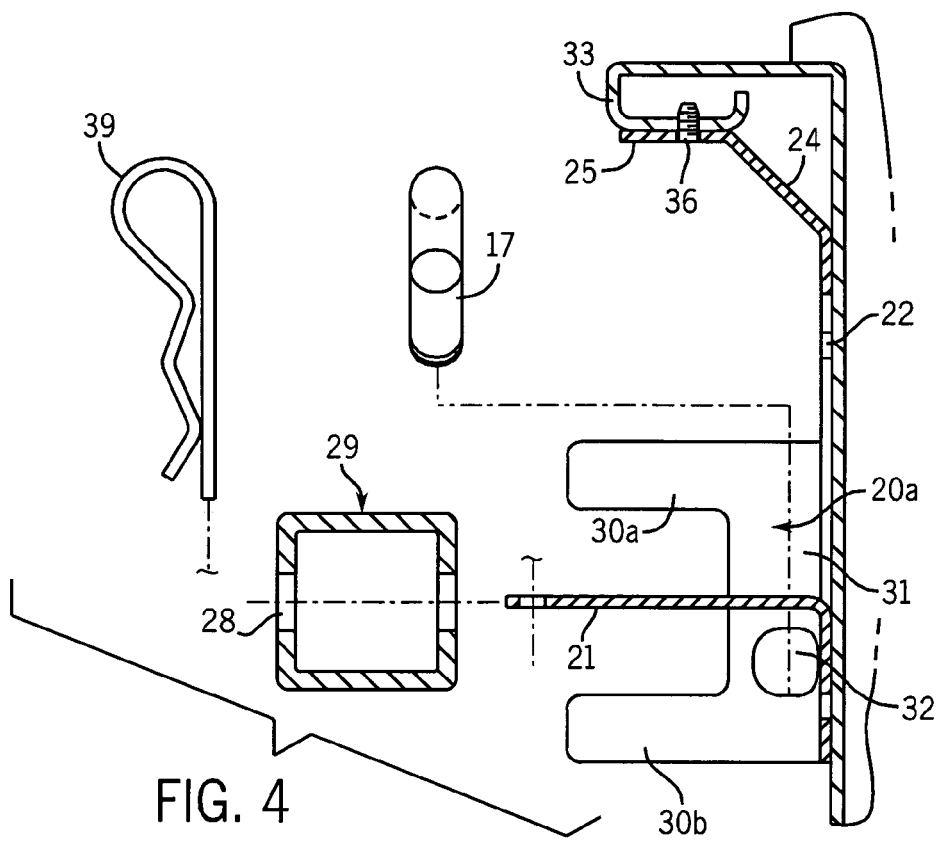
FIG. 4 is an exploded cross-sectional view of the apparatus and trailer hitch as illustrated in FIG. 3.
Figure 5:
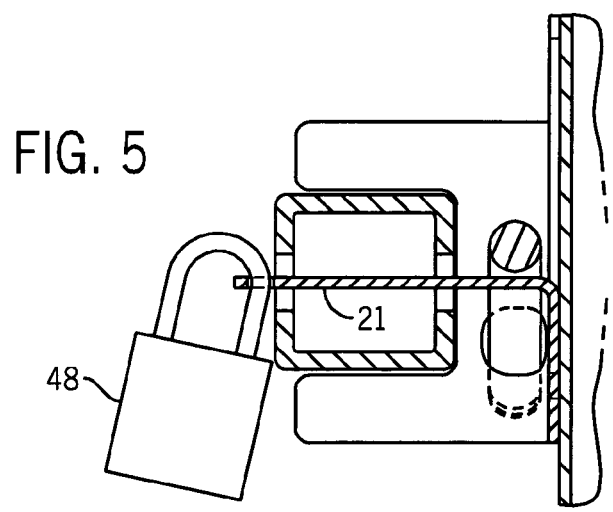
FIG. 5 is a cross-sectional view similar to FIG. 3, showing an alternative locking feature.

Referring now to FIGS. 1, 3, and 4, in use, a user first removes the trailer hitch 16 from the hitch receiver of a vehicle (not shown) by removing the hitch pin 17 and disengaging the trailer hitch 16 from the hitch receiver. One of the ends of hitch pin 17, shown at 37, is then inserted through one of the hitch pin receiving holes 32 in vertical support 31 of one of brackets 20a, 20b. The hitch pin 17 is inserted in a manner such that the juncture 46 rests on the center post 21. Once the hitch pin 17 is secured in this manner, the trailer hitch 16 is placed on the apparatus 15. The trailer hitch 16 is placed in a manner that the tubular support 29 rests within the receiving arms 30a, 30b of the receiving brackets 20a, 20b. The center post 21 extends through the hitch pin aperture 28 in the tubular support 29. A cotter pin 39 or other securing means is inserted through the center post aperture 35 to secure the trailer hitch 16 to the apparatus 15. FIG. 5 illustrates an alternative means for securing the trailer hitch 16 to the storage apparatus. In this version, a lock 48 is inserted through the center post aperture 35. Once engaged, the lock 48 prevents the theft of the trailer hitch 16 from the storage apparatus 15.

Figure 6:
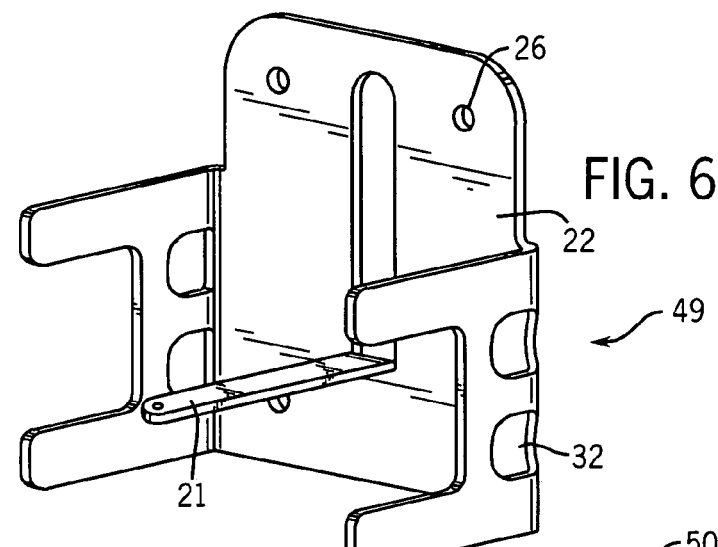

FIG. 6 illustrates an alternative preferred embodiment of the trailer hitch storage apparatus of the present invention. The alternative embodiment shown in FIG. 6 shares several of the key components of the embodiment discussed in reference to FIGS. 1–5, and therefore those shared components need not be discussed in detail and will be referred to using like numerals. FIG. 6 illustrates a trailer hitch storage apparatus 49 designed for attachment to the rear interior of an SUV or other vehicle having an enclosed interior compartment suitable for carrying trailer hitch 16 when not in use. As illustrated in FIG. 6, the mounting bracket 25 shown in FIGS. 1–5 has been eliminated and the top of the base plate 22 has been rounded off. The trailer hitch storage apparatus 49 is attached to the rear interior wall of the vehicle via the base plate apertures 26. Screws or other securing means are inserted through the apertures 26 to secure the trailer hitch storage apparatus 49 to the rear interior wall of the vehicle. Other than the alternative means of mounting, the trailer hitch storage apparatus 49 operates in substantially the same manner as the truck trailer hitch storage apparatus 15 described in reference to FIGS. 1–5.

Figure 7:
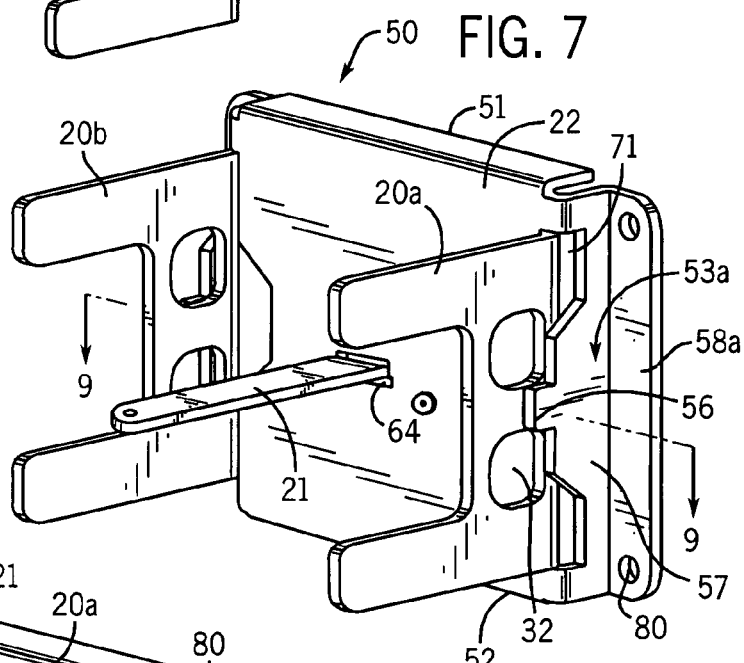
FIG. 7 is an isometric view of a third embodiment of the trailer hitch storage apparatus of the present invention which is adapted to be collapsed when not in use, showing the trailer hitch storage apparatus in an extended position.

FIGS. 7–13 illustrate yet another alternative embodiment of the present invention. This embodiment contemplates a trailer hitch storage apparatus 50 that is collapsible to save space when not in use. Again, the alternative embodiment shown in FIGS. 7–13 shares several of the key components of the embodiment discussed in reference to FIGS. 1–6, and therefore those shared components need not be discussed in detail and will be referred to using like numerals. FIGS. 7, 9, and 10 demonstrate the trailer hitch storage apparatus 50 in its extended, operative position, while FIGS. 8, 11, and 12 demonstrate the trailer hitch storage apparatus in its collapsed, inoperative position.

As shown in FIG. 7, the base plate 22 is connected to integral upper and lower base walls 51, 52, respectively, which extend horizontally outwardly from the base plate 22. First and second side walls 53a, 53b, respectively also extend from the base plate 22. The side walls 53a, 53b include respective retaining extensions 56a, 56b that extend from respective bases 57a, 57b. The retaining extensions 56a, 56b abut the respective receiving brackets 20a, 20b in order to place receiving brackets 20a, 20b in the extended position (FIG. 7). Between the side walls 53a, 53b and the base plate 22 are respective slots 71a, 71b through which the respective receiving brackets 20a, 20b extend. Extending from the respective side wall bases 57a, 57b are respective side mounting plates 58a and 58b. The mounting plates 58a, 58b include a pair of apertures 80 configured to receive a mounting means, such as fasteners as noted previously, for mounting the trailer hitch storage apparatus 50 to the interior wall of a vehicle. There is also a center post slot 64 on the base plate 22 that has a width that is less than the width of the center post 21, thereby allowing pivotal movement of center post 21 while preventing removal of the center post 21 through the rear of the base plate 22.

As shown in FIGS. 7–13, the receiving brackets 20a, 20b and the center post 21 are pivotally connected to the base plate 22, thereby allowing the trailer hitch storage apparatus 50 to be collapsed when not in use. Receiving brackets 20a, 20b include respective multi-width pivot arms 59a, 59b. The pivot arms 59a, 59b of the respective receiving brackets 20a, 20b extend inwardly from the respective brackets 20a and 20b at a right angle adjacent to the base plate 22 when the brackets 20a and 20b are fully extended. The pivot arms 59a, 59b include a first width 84 and a second width or tab 86. The first width 84 of the pivot arm is slightly less than the length of slot 71 allowing for pivotal rotation of the receiving brackets 20a, 20b through the slot 71. The second width 86 is greater than the length of the slot thereby restricting the receiving brackets 20a, 20b from being removed out the front of the base plate 22 through the slot 71. The pivot arms 59a, 59b pivot on the edges of the base plate 22 between an extended position, FIGS. 7, 9, and 10 and a collapsed position, FIGS. 8, 11, and 12.

In a similar manner, the center post 21 includes an integral center post pivot arm 63, extending at a substantially right angle from the center post 21 that allows the center post 21 to pivot on the center post slot 64 between an extended position and a collapsed position. The pivot arm 63 includes a first width 73 less than the width of the slot 64 that allows the pivot arm 63 to pivot through the slot 64 and a second width 74 substantially greater than the dimensions of the slot 64 that prevents removal of the center post 21 through the front of the base plate 22 via the slot 64. Although a specific pivot means is disclosed in reference to the center post 21 and receiving brackets 20a, 20b, other means of collapsibility such as a hinged connection are envisioned by the present invention.

Figure 11:
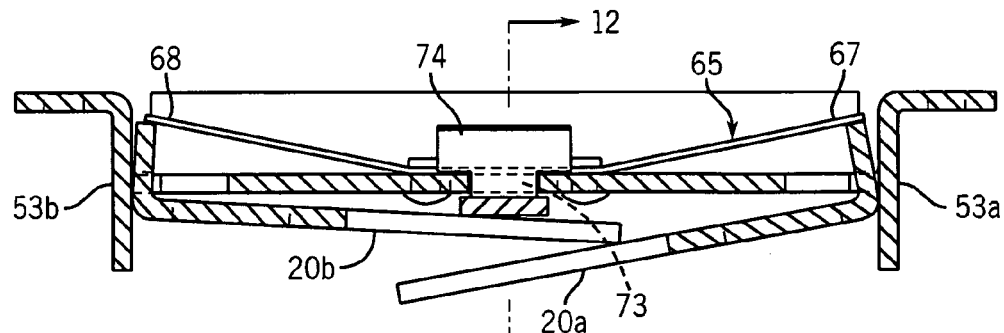
FIG. 11 is a cross sectional view taken on line 11—11 of FIG. 8.

Referring now to FIGS. 9–13, various views are shown of the trailer hitch storage apparatus 50 in its collapsed and extended positions, demonstrating the movement of the pivoting center post 21 and pivoting receiving brackets 20a, 20b. Behind the base plate 22 is a biased, semi-flexible retention member 65, which is preferably in the form of a leaf spring, secured to the rear of the base plate 22. The retention member 65 is fixedly secured to the base plate 22 at a central region 66 while its ends 67, 68 are unrestrained. The biased arrangement allows the retention member 65 to provide sufficient retention forces on the receiving brackets 20a, 20b both in the collapsed and extended positions. As best shown in FIG. 9, when the receiving brackets 20a and 20b are in their extended positions, the pivot arms 59 of the receiving brackets 20a, 20b are held in place by the retention member 65. As shown in FIG. 11, when the receiving brackets 20a, 20b are in their collapsed position, the ends 67, 68 of the retention member 65 press the pivot arms 59 against the interior of the side walls 53a 53b thereby retaining the receiving brackets 20a, 20b in their collapsed position.

Figure 8:
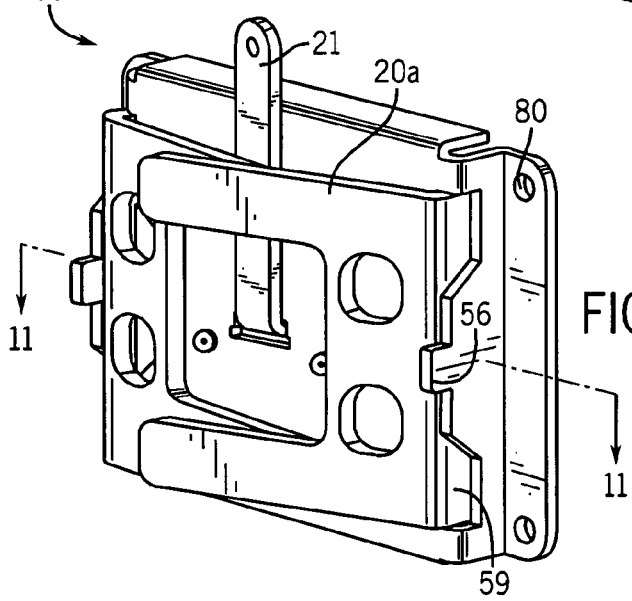
FIG. 8 is an isometric view of the apparatus of FIG. 7, showing the apparatus in a collapsed position.
Figure 12:
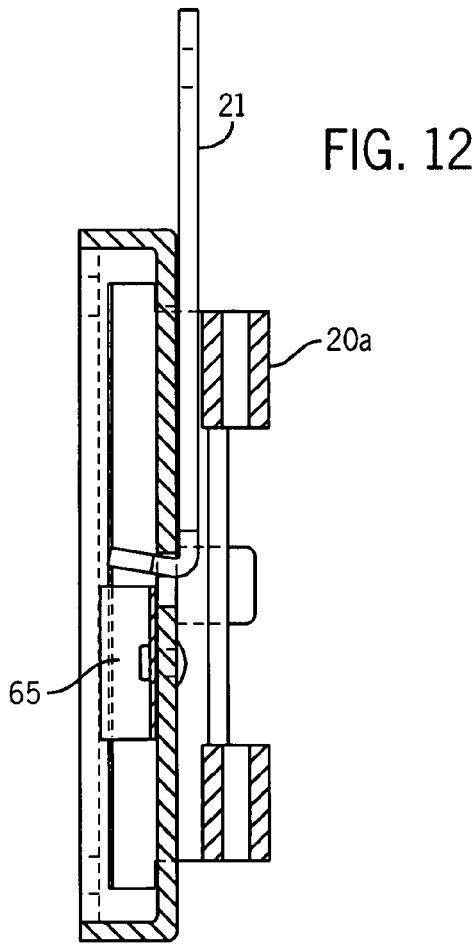
FIG. 12 is a cross-sectional view taken on line 12—12 of FIG. 11.
Figure 13:
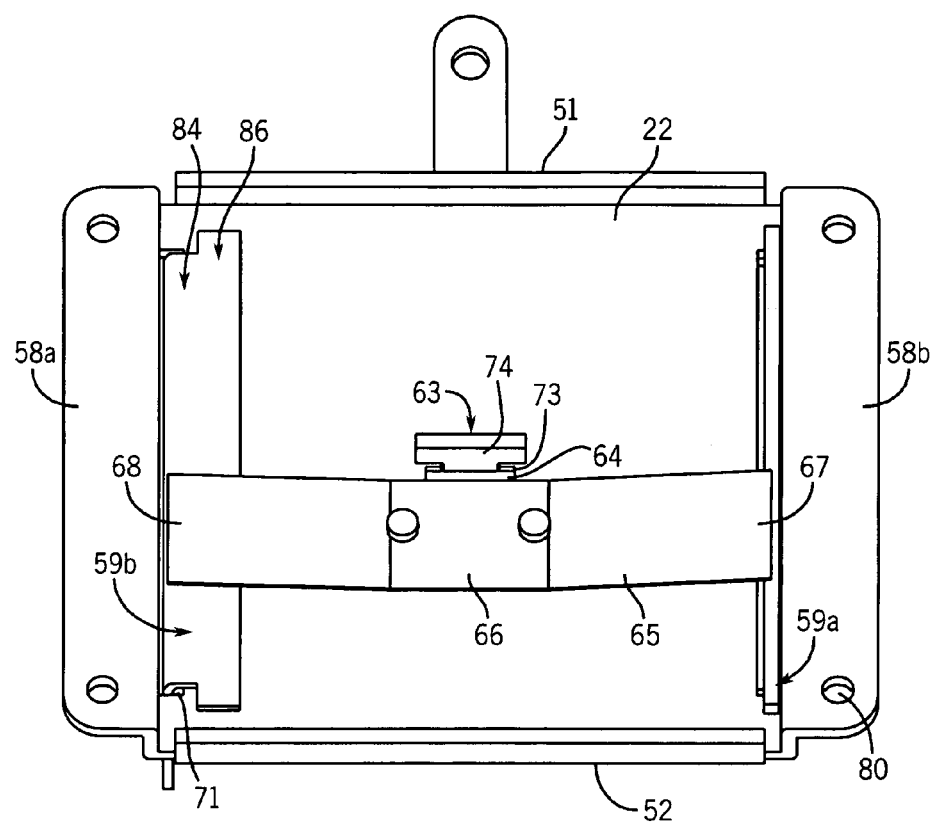
FIG. 13 is a rear isometric view of the third embodiment of the trailer hitch storage apparatus of the present invention shown in FIG. 7, showing one receiving bracket extended and one receiving bracket collapsed.

Use of the collapsible apparatus 50 to store a trailer hitch 16 occurs in the same manner as previously described. When not in use, the apparatus 15 can be collapsed to maximize space (FIGS. 8, 12). In order to collapse the device, the center post 21 is first pivoted to an upright collapsed position adjacent the base plate 22. The receiving brackets 20a, 20b are then pivoted inward over the center post 21. As described above, the ends 67, 68 of the retention member 65 provide sufficient force to maintain the receiving brackets 20a, 20b in the collapsed position. The collapsed receiving brackets 20a 20b, further retain the center post 21 in its collapsed position.

Figure 14:
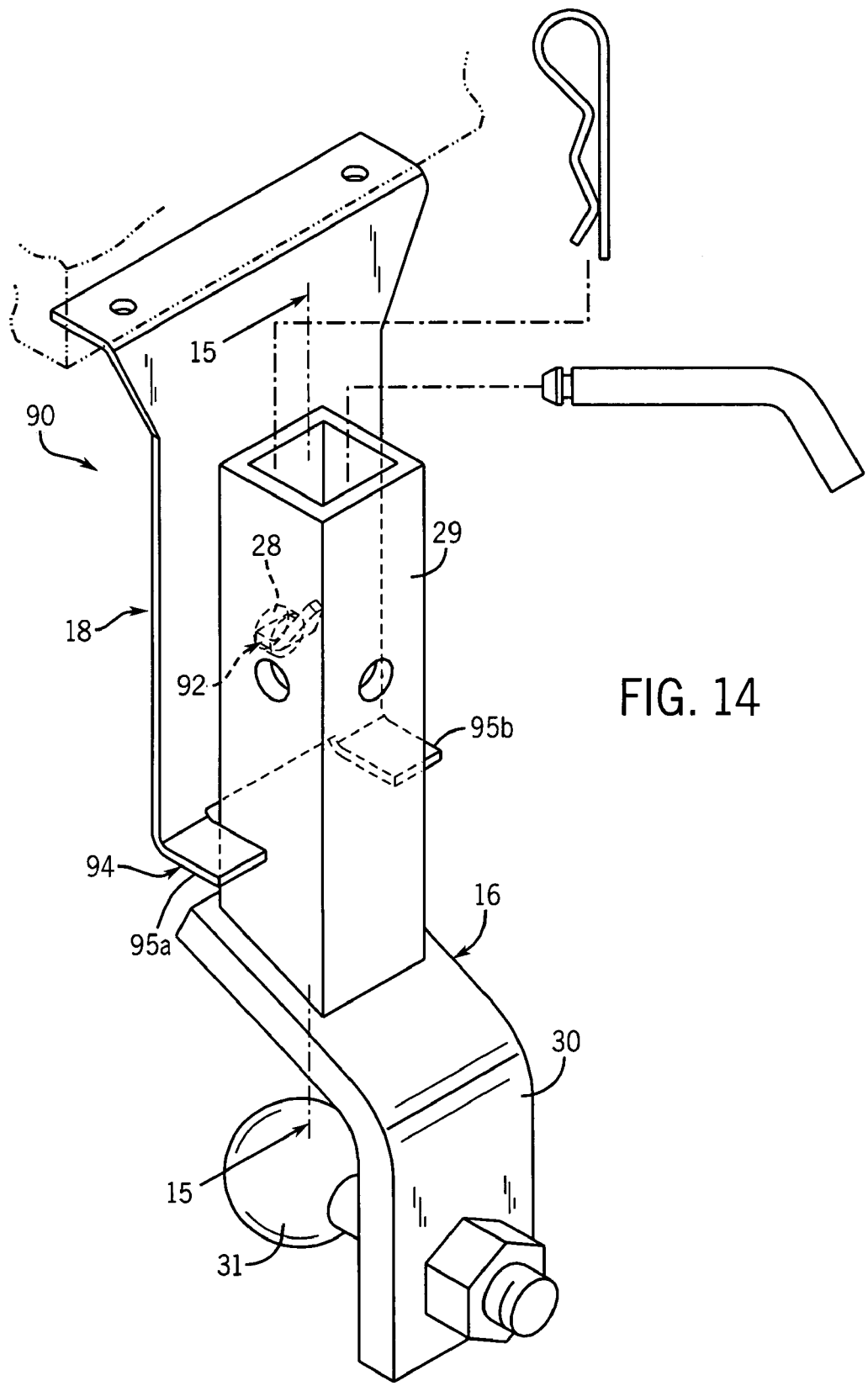
FIG. 14 is a front elevation view of a fourth embodiment of the trailer hitch storage apparatus of the present invention attached to a pickup truck bed, the apparatus shown retaining the trailer hitch.
Figure 15:
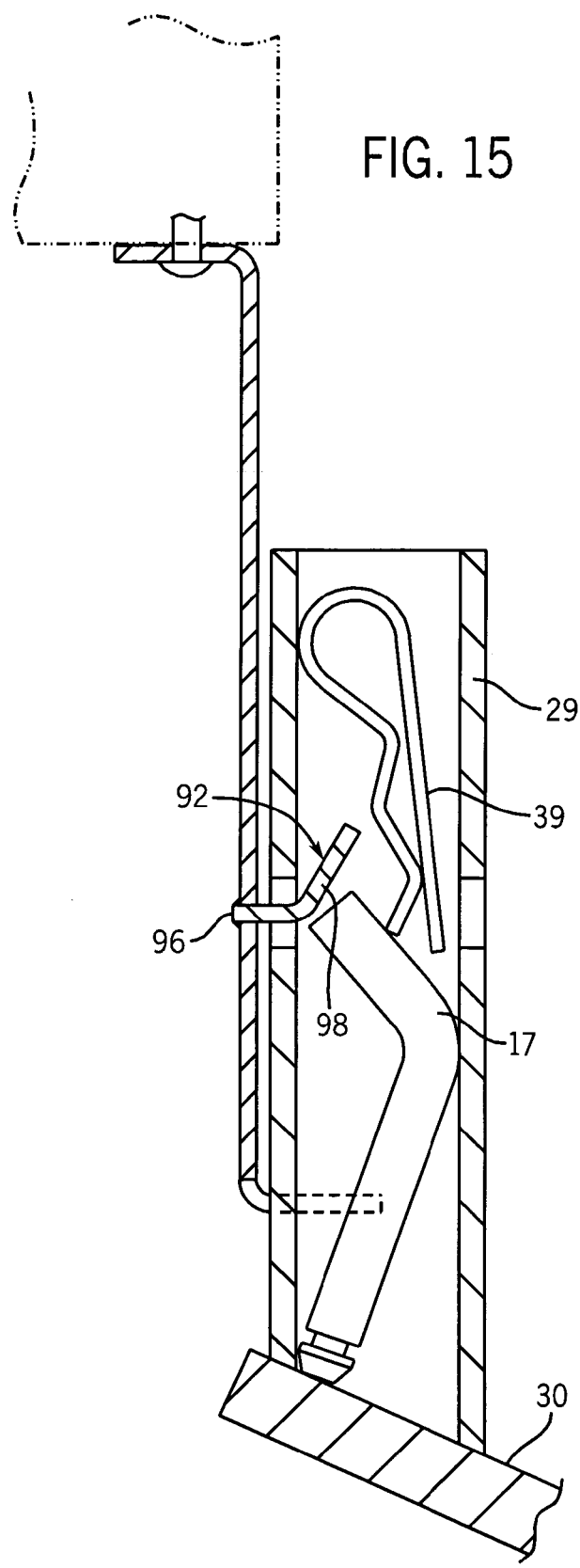
FIG. 15 is a cross-sectional view of the attached apparatus and trailer hitch, taken on line 15—15 of FIG. 14.

FIGS. 14 and 15 illustrate yet another alternative embodiment of the present invention. This embodiment contemplates a trailer hitch storage apparatus 90 that includes a hook or hanger 92 projecting from the base plate 22 as opposed to the center post previously described. These structural alternatives operate in functionally similar manner in relation to the present invention. Again, the alternative embodiment shown in FIGS. 14 and 15 shares several of the key components of the embodiments discussed in reference to FIGS. 1–13, and therefore those shared components need not be discussed in detail and will be referred to using like numerals.

As shown in FIG. 14, the base plate 22 includes a single trailer hitch receiving bracket 94 extending outwardly from the base plate 22 and configured to receive and secure the tubular support 29 of the trailer hitch 16. The receiving bracket 94 includes receiving arms 95a and 95b that extend from the base plate a distance long enough to secure and retain the tubular support 29.

The hanger 92 extends from the central area of the base plate 22. The hanger 92 includes a first horizontal section 96 that extends perpendicular to the base plate and projects outwardly therefrom; and a second angled section 98 projecting upwardly from the first section at an angle of about 45 degrees. The hanger 92 has a width that is configured to allow the hanger 92 to fit through the hitch pin receiving hole 28 of the tubular support 29 of the trailer hitch 16. As shown in FIG. 15, the hitch pin 17 and cotter pin 39 may be stored within the hollow interior region of the tubular support 29.

In use, a user first removes the trailer hitch 16 from the hitch receiver of a vehicle by removing the hitch pin 17 and disengaging the trailer hitch 16 from the hitch receiver. The trailer hitch 16 is then placed in a manner that the tubular support 29 rests within the arms 95a, 95b of the receiving bracket 94 and the hanger 92 extends through the hitch pin aperture 28 and supports the hitch 16. In the preferred embodiment, the trailer hitch 16 is placed in a manner such that trailer engagement bar 30 and ball assembly 31 project downwardly. This arrangement allows the hollow region of the tubular support 29 to project upwardly thereby defining a storage region for the hitch pin 17 and the cotter pin 39.

Various alternatives and modifications are contemplated as being within the scope of the following claims particularly pointing out and distinctly claiming the subject matter regarded as the invention.

I claim:

1. A trailer hitch storage apparatus for storing a trailer hitch on a vehicle, wherein the trailer hitch includes a support member that extends along a longitudinal axis and defines a transverse pin-receiving opening, comprising:
    a mounting member configured to be attached to the vehicle;
    a bracket arrangement extending outwardly from the mounting member, wherein the bracket arrangement includes at least one outwardly open recess configured to receive the support member of the trailer hitch, wherein the outwardly open recess of the bracket arrangement is configured to receive the support member upon movement of the support member toward the mounting member into the open recess in a direction transverse to the longitudinal axis of the support member; and
    a hanger carried by and extending outwardly from the mounting member, wherein the hanger is configured to extend into the pin-receiving opening of the support member upon movement of the support member toward the mounting member into the open recess.

2. The trailer hitch storage apparatus of claim 1, wherein the hanger comprises a first section secured to and extending outwardly from the mounting member, and a second section extending from the first section and angled upwardly relative to the first section.

3. The trailer hitch storage apparatus of claim 1, wherein the bracket arrangement comprises a pair of horizontally spaced brackets, and wherein the hanger comprises an outwardly extending post that extends from the mounting member between the pair of brackets.

4. The trailer hitch storage apparatus of claim 3, wherein the outwardly extending post is configured to extend entirely through the support members and defines a distal end that includes an aperture configured to receive a securing means.

5. The trailer hitch storage apparatus of claim 4, wherein the securing means is an anti-theft device that prevents removal of the trailer hitch from the storage apparatus.

6. The trailer hitch storage apparatus of claim 5, wherein the anti-theft device is a lock inserted through the aperture on the center post.

7. The trailer hitch storage apparatus of claim 3, wherein the pair of brackets and the outwardly extending post are pivotally connected to the mounting member.

8. The trailer hitch storage apparatus of claim 3, wherein the pair of brackets and the outwardly extending post are hingedly attached to the mounting member.

9. The trailer hitch storage apparatus of claim 3, wherein each of the pair of horizontally spaced brackets includes at least one hole configured to receive a hitch pin.

10. The trailer hitch storage apparatus of claim 1, wherein the mounting member, the bracket arrangement and the hanger are formed integrally with each other.

11. The trailer hitch storage apparatus of claim 1, wherein the mounting member defines an upper end that includes a horizontal engagement plate configured for attachment of the apparatus to an inner wall of a truck bed wall.

12. A trailer hitch retention device for use in combination with a vehicle for storing a trailer hitch on the vehicle, wherein the trailer hitch includes a support member that extends along a longitudinal axis and defines a transverse pin-receiving opening, comprising:
    a body configured for mounting to the vehicle, wherein the body includes an upright wall and an outward extension carried by the body and projecting outwardly from the upright wall for providing a first support to the support member of the trailer hitch through a the pin-receiving opening, wherein the extension is configured to extend into the pin-receiving opening of the support member upon movement of the support member toward the body into the open recess; and
    at least a pair of arms extending from the upright wall, wherein the pair of arms define an outwardly open recess configured to receive the support member of the trailer hitch, wherein the outwardly open recess defined by the at least one pair of arms is configured to receive the support member upon movement of the support member toward the body into the open recess in a direction transverse to the longitudinal axis of the support member, for retention and support of a trailer hitch from the body.

13. The trailer hitch retention device of claim 12, wherein each of the pair of arms includes at least one hole for receiving an end of a hitch pin.

14. The trailer hitch retention device of claim 12, wherein the outward extension defines a length greater than a transverse dimension of the support member of the trailer hitch and includes a hole for receiving a securing device.

15. The trailer hitch retention device of claim 14, wherein the securing device is a cotter pin.

16. The trailer hitch retention device of claim 14, wherein the securing device is a lock.

17. The trailer hitch retention device of claim 12, wherein the extension and the pair of arms are pivotally mounted to the body to enable the device to be collapsed when not in use.

* * * * *

UNITED STATES PATENT AND TRADEMARK OFFICE
CERTIFICATE OF CORRECTION

| | | |
|---|---|---|
| PATENT NO. | : 7,055,844 B1 | Page 1 of 1 |
| APPLICATION NO. | : 10/806599 | |
| DATED | : June 6, 2006 | |
| INVENTOR(S) | : Thomas Bostedt | |

It is certified that error appears in the above-identified patent and that said Letters Patent is hereby corrected as shown below:

IN THE CLAIMS

CLAIM 4, col. 8, line 3, delete "members" and substitute therefore -- member, --;

CLAIM 6, col. 8, line 10, delete "center" and substitute therefore -- outwardly extending --;

CLAIM 12, col. 8, line 40, delete "the" ($2^{nd}$ occurrence) and substitute therefore -- an outwardly --;

CLAIM 12, col. 8, line 42, delete "an" and substitute therefore -- the --;

CLAIM 12, col. 8, line 49, delete "a" and substitute therefore -- the --.

Signed and Sealed this

Nineteenth Day of September, 2006

JON W. DUDAS
*Director of the United States Patent and Trademark Office*